(12) United States Patent
Alvarez Rivera et al.

(10) Patent No.: US 8,562,201 B2
(45) Date of Patent: Oct. 22, 2013

(54) LIGHT PIPE WITH INTEGRATED PERIMETER CHASSIS, AND DEVICES USING THE LIGHT PIPE

(75) Inventors: Felix Jose Alvarez Rivera, San Jose, CA (US); Jean-Pierre S. Guillou, San Francisco, CA (US); Emery Sanford, San Francisco, CA (US)

(73) Assignee: Apple, Inc., Cupertino, CA (US)

( * ) Notice: Subject to any disclaimer, the term of this patent is extended or adjusted under 35 U.S.C. 154(b) by 230 days.

(21) Appl. No.: 13/038,167

(22) Filed: Mar. 1, 2011

(65) Prior Publication Data
US 2012/0224390 A1 Sep. 6, 2012

(51) Int. Cl.
*F21V 7/10* (2006.01)
(52) U.S. Cl.
USPC ........... 362/633; 362/632; 362/629; 362/615; 362/613; 362/612
(58) Field of Classification Search
USPC ........... 362/23.09, 23.16, 612, 613, 615, 629, 362/632, 633
See application file for complete search history.

(56) References Cited

U.S. PATENT DOCUMENTS

| | | | |
|---|---|---|---|
| 6,068,381 A * | 5/2000 | Ayres | 362/633 |
| 6,685,328 B1 | 2/2004 | Hanson et al. | |
| 2004/0183991 A1 | 9/2004 | Kuo | |
| 2006/0279688 A1 | 12/2006 | Wu et al. | |
| 2007/0047265 A1 | 3/2007 | Kang et al. | |
| 2009/0003004 A1 | 1/2009 | Chen et al. | |
| 2009/0168807 A1 | 7/2009 | Nakatsugawa et al. | |

OTHER PUBLICATIONS

International Search Report dated May 11, 2012 from PCT Application No. PCT/US2012/026148.
Written Opinion dated May 11, 2012 from PCT Application No. PCT/US2012/026148.

* cited by examiner

*Primary Examiner* — Ismael Negron
(74) *Attorney, Agent, or Firm* — Fletcher Yoder PC (57) ABSTRACT

A display assembly including an integrally formed light pipe and perimeter chassis, and a display glass above the light pipe is provided. The display glass includes transmissive elements configured to form an image on the display glass. The light pipe can be utilized to provide back-lighting for the display glass. In one embodiment, the light pipe and the perimeter chassis can be formed using a co-molding process.

22 Claims, 8 Drawing Sheets

LIGHT PIPE WITH INTEGRATED PERIMETER CHASSIS, AND DEVICES USING THE LIGHT PIPE

BACKGROUND

1. Field of the Invention

The invention relates to consumer electronic devices and more particularly, methods and apparatus associated with the design of displays for thin-profile consumer electronic devices.

2. Description of the Related Art

From a visual stand point, users often find compact and sleek designs of consumer electronic devices more aesthetically appealing. As an example, portable electronic device designs that are both thin and light-weight are often popular with consumers. In some thin device designs, one face of the device is almost entirely dedicated to a viewable portion of the display while other input/output components are arranged around the sides and/or back of the device opposite the display. Typically, the display is surrounded by a thin profile enclosure where the display controller, main logic board, battery and other interface circuitry are all packaged within the enclosure.

Often back-lit displays are used in thin-profile electronic devices. A back-lit display, such as a liquid crystal display, can consist of a display glass component with a number of elements that can be controlled to vary the light transmissivity across the display glass. By varying the light transmissivity across the display glass, different images can be viewed on the back-lit display.

One objective in the design of back-lit displays is to provide relatively homogenous optical properties, such as an even lighting brightness, across the display from the edges to the center. For example, it is undesirable for the back lighting to generate local areas of brightness and dimness on the display, such as dimmer near the edges and brighter near the center. Local areas of brightness and dimness on the display are undesirable because the contrast level of the image output from the display is altered. The alteration of the contrast level of the image can cause details of the image that are viewable on a display with a more homogenous brightness to become un-viewable.

The distribution of the lighting brightness across a display can be affected by the placement of one or more illumination sources that generate the light emitted from the display and a path that the light from the illumination sources travels before it is emitted from the display. As an example, a light pipe can be used to distribute light from the illumination sources near the edge of the display to different parts of the display including the opposite edge of the display. The path that light takes before it is emitted from the display can include reflecting off of one or more different surfaces. Unless the surfaces are properly designed, light reflection can cause local areas of brightness and dimness on the display and subsequently distort the displayed images.

As consumer electronic devices and their associated display stacks are made thinner, bending of the device including the display stack becomes an issue that can affect the light emitting properties of the display. For example, the force of a user interacting with an electronic device, such as via a touch screen interface, can cause a light pipe and an associated display glass in the display underneath the touch screen to move and/or deform. The resulting movement and deformation of the light pipe can change the light paths associated with the light pipe such that its light emitting properties are altered. As the light pipe is flexed from one shape to another shape, the light emitting properties of the light pipe can be altered such that a noticeable distortion in an image output on the display is generated.

In view of the above, display components, such as light pipe and its supporting structure, are desired that address optical issues that can result from the structural deformation associated with operating a light-weight portable electronic device with a thin and compact enclosure.

SUMMARY

Broadly speaking, the embodiments disclosed herein describe structural components well suited for use in consumer electronic devices, such as laptops, cellphones, netbook computers, portable media players and tablet computers. In particular, structural components are described that address both strength and optical issues associated with the design of a light-weight consumer electronic device with a thin and compact enclosure and an associated thin-profile display. Methods for forming these structural components are also described.

In one embodiment, the consumer electronic device can be a thin-profile portable electronic device with an associated thin-profile display assembly. The display assembly can include a perimeter chassis integrally formed with a light pipe. In one embodiment, the light pipe and the perimeter chassis can be substantially rectangular shaped where the perimeter chassis is substantially hollow such that the light pipe is disposed within an interior portion the perimeter chassis.

A display glass including variable transmissive elements, such as liquid crystals, can be mounted above the light pipe such that it is partially disposed within and surrounded by the perimeter chassis. The light pipe can be configured to distribute light from one or more illumination sources located at one edge of the light pipe, such as light emitting diodes (LEDs). The light pipe and its surrounding structure can be designed to transmit the light along a length of the light pipe such that a bottom of the display glass is illuminated in a relative homogenous manner. A processor located within the electronic device can be configured to control the transmissive elements in the display glass such that in conjunction with the light provided by the light pipe images are output from and viewable on the display.

As the display assembly is thinned, the overall stiffness of the structure can be lessened. One advantage of integrally forming the light pipe and the perimeter chassis can be to increase a stiffness of the display assembly. The increase in stiffness can lessen deformations associated with the light pipe that can occur during operation of the electronic device. Thus, allowing a thinner display assembly to be utilized. Deformations of the light pipe can change its optical characteristics, such as its light distribution properties, and cause images generated on the display glass to appear distorted. Another advantage of integrally forming the light pipe and perimeter chassis is that gaps between an outer perimeter edge of the light pipe and an inner edge of the perimeter chassis can be minimized and possibly eliminated. The elimination of the gaps can minimize undesirable light leakage associated with the light pipe.

In particular embodiments, the perimeter chassis and the light pipe can be integrally formed using a co-molding process. For instance, the light pipe can be first formed in a first step of the molding process and then the perimeter chassis can be formed in a second step of the molding process or vice versa. The materials used for the light pipe and perimeter chassis can be selected such that in areas where the perimeter chassis and the light pipe are in contact with one another a bond is generated between the light pipe and the perimeter chassis during the co-molding processes. The coefficients of thermal expansion for the materials used to form the light pipe and the perimeter chassis can be selected so that the bonds formed during the co-molding process are maintained during contraction and expansion of the integrally formed component that can occur during operation of the electronic device.

In one embodiment, the light pipe can be formed from an optical grade transparent plastic, such as a polycarbonate plastic and the perimeter chassis can be formed from another type of plastic material, such as a plastic in the same material family as the light pipe. In a particular embodiment, the perimeter chassis can be formed from a "black," i.e., a relatively non-light reflecting material. In another embodiment, the light reflecting properties of perimeter chassis can be varied throughout the component. For instance, one portion of the perimeter chassis can be "white," such that is relatively reflective of light, while another portion of the perimeter chassis can be less reflective.

In particular embodiments, the light pipe can include a mixing region where light from the illumination sources is mixed. The mixing region can be relatively thicker than other portions of the light pipe. In one embodiment, an outer surface of the light pipe, such as a top surface of the light pipe opposite a bottom of the display glass can be textured. The texturing can be employed to provide a more even distribution of light emitted from the light pipe. For instance, light passing through the texturing can be diffused to increase its evenness. In other embodiments, outer edges of the light pipe can be shaped to produce a desired reflectance pattern of light near the outer edges. Portions of the outer edges of the light pipe can be surrounded by and in contact with inner edge portions of the perimeter chassis. As described above, in these areas of contact, the perimeter chassis and the light pipe may be bonded to one another.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

A display assembly for a back-lit display can include a display glass, a light pipe and a perimeter chassis. The display glass can provide a number of controllable transmissive elements, such as liquid crystals, that can be used to form images on the display glass. To allow the images to be viewable, one or more light sources can be used to generate light that is passed through the bottom of the display glass and out towards a user viewing the images formed on the display glass. The light pipe can be used to transmit the light generated by the one or more light sources through the bottom of the display glass. The perimeter chassis can be used to support and/or align other components in a display assembly associated with the display, such as a display glass and a light pipe. The display glass and the light pipe can be partially enclosed and/or surrounded by the perimeter chassis.

To reduce the thickness of an electronic device, it is usually necessary to reduce the thickness of various components in the device, such as the display, while maintaining functionality of each component. Reducing the thickness of the display assembly generally requires removing structure from the assembly, such as the structure associated with the perimeter chassis, display glass and the light pipe, which tend to be among the thicker components of the display assembly. As the components of the display assembly become thinner, structural stiffness of the assembly can be lost. Structural stiffness is a concern because undesired bending can affect the optical properties of the display, such as the distribution of light generated from the light pipe, in a way that degrades the image quality output from the display. The effects of the structural stiffness on the optical properties are illustrated in more detail in the following paragraphs in reference to a couple of display assembly designs.

In a first design of a back-lit display assembly, the perimeter chassis can be formed as a proximately rectangular sheet. The rectangular sheet can include raised edges around its perimeter such that an open rectangular cavity is formed. The display glass and the light pipe can be sized to fit within the open rectangular cavity where the edges of the cavity keep the display glass and light pipe aligned with one another in a stacked configuration. In this example, the light pipe is positioned such that is disposed between the display glass and the rectangular sheet that forms the bottom of the perimeter chassis of the display assembly. Thus, in this design, the display assembly can include a layer associated with the perimeter chassis, a layer associated with a light pipe and a layer associated with the display glass. The bottom portion of the perimeter chassis can add to the stiffness of the display assembly and can help prevent the light pipe from moving because the light pipe is sandwiched between the display glass and the bottom portion of the perimeter chassis.

In a second design, to reduce the thickness of the display assembly the bottom layer of the perimeter chassis can be removed. Thus, the perimeter chassis can be a hollow rectangular shaped element that surrounds the display glass and the light pipe. When the display glass and the light pipe are disposed within the perimeter chassis, the perimeter chassis can help to keep these two components aligned with one another.

In the first and the second design, the light pipe may not be directly attached to the perimeter chassis but is instead suspended from the display glass. It was found that as the display assembly and its associated components, such as the display glass and the light pipe, become increasingly thinner, an actuation of a touch screen interface above the display glass can cause the display glass and the light pipe to move and deform. The movement and/or deformation of the light pipe can affect its light emitting quality such that images generated on the display glass above the light pipe can appear distorted. In the first design, the downward movement of the display glass and the light pipe are limited because the perimeter chassis includes a bottom that restricts the downward motion of the light pipe. However, in the second design, the downward motion is no longer restricted because the perimeter chassis no longer includes a bottom.

To mitigate the movement and/or deformation of the light pipe, one approach is to increase its stiffness and/or constrain its motion. One approach to increasing the stiffness of the light pipe is to make it thicker. However, since a design objective is to minimize the thickness of the display, increasing the thickness of the light pipe is undesirable. As will be described in more detail as follows, another approach is to attach the light pipe to the perimeter chassis to increase its stiffness. By attaching the perimeter chassis to the light pipe, the effective thickness of the light pipe and hence its stiffness is increased. However, the overall thickness of the display assembly is not increased because the perimeter chassis is already a part of the display assembly. This design is similar to the first design described above where the perimeter chassis includes a bottom except the bottom of the perimeter chassis is now formed by the light pipe.

Figure 4A:
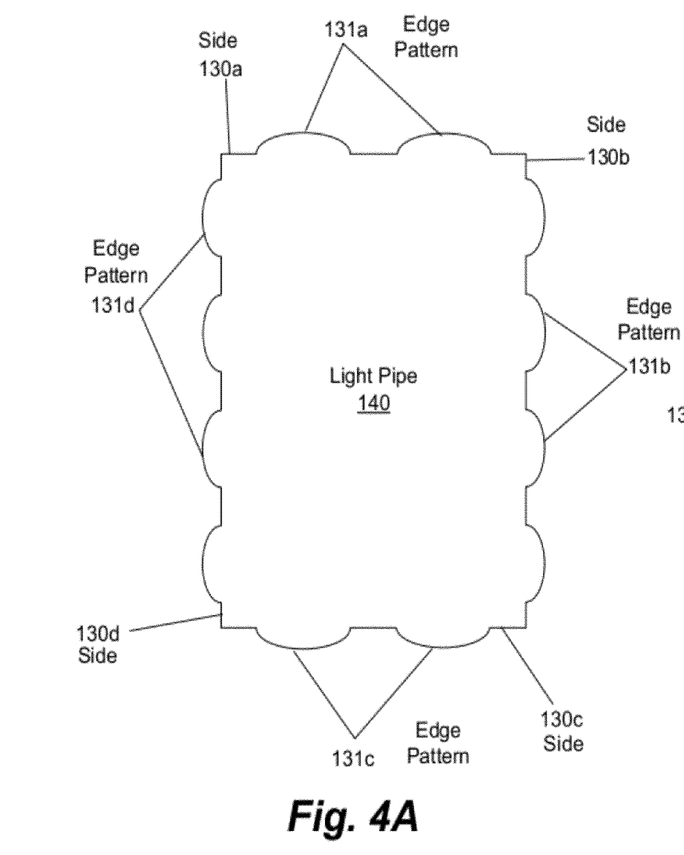
FIGS. 4A-4B show top views of light pipes in accordance with the described embodiments.
Figure 4B:
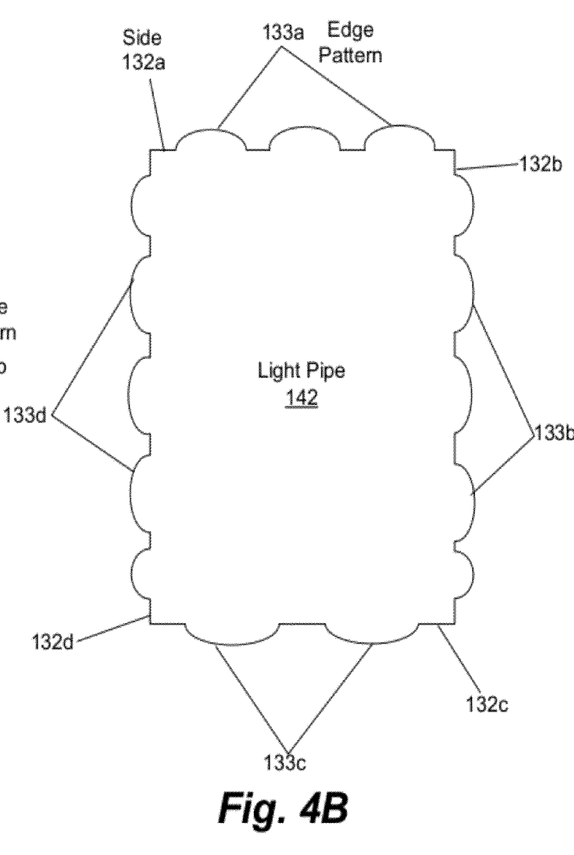
Figure 5A:
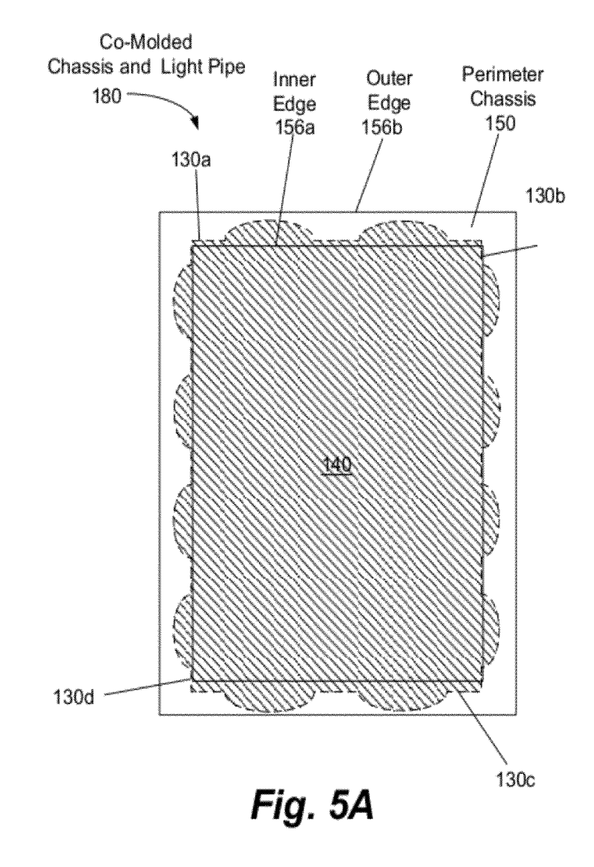
FIGS. 5A-5C show top views of an integrally formed light pipes and perimeter chassis in accordance with the described embodiments.
Figure 5B:
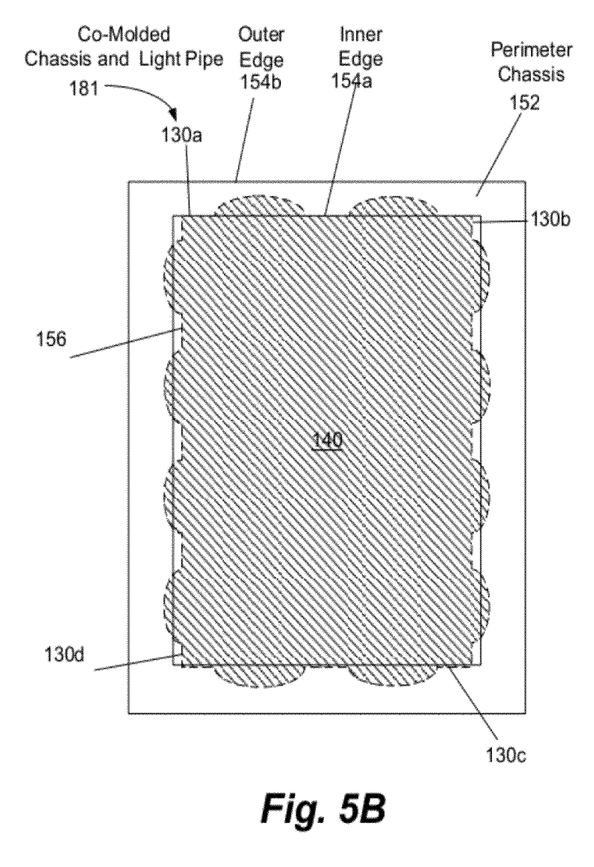
Figure 5C:
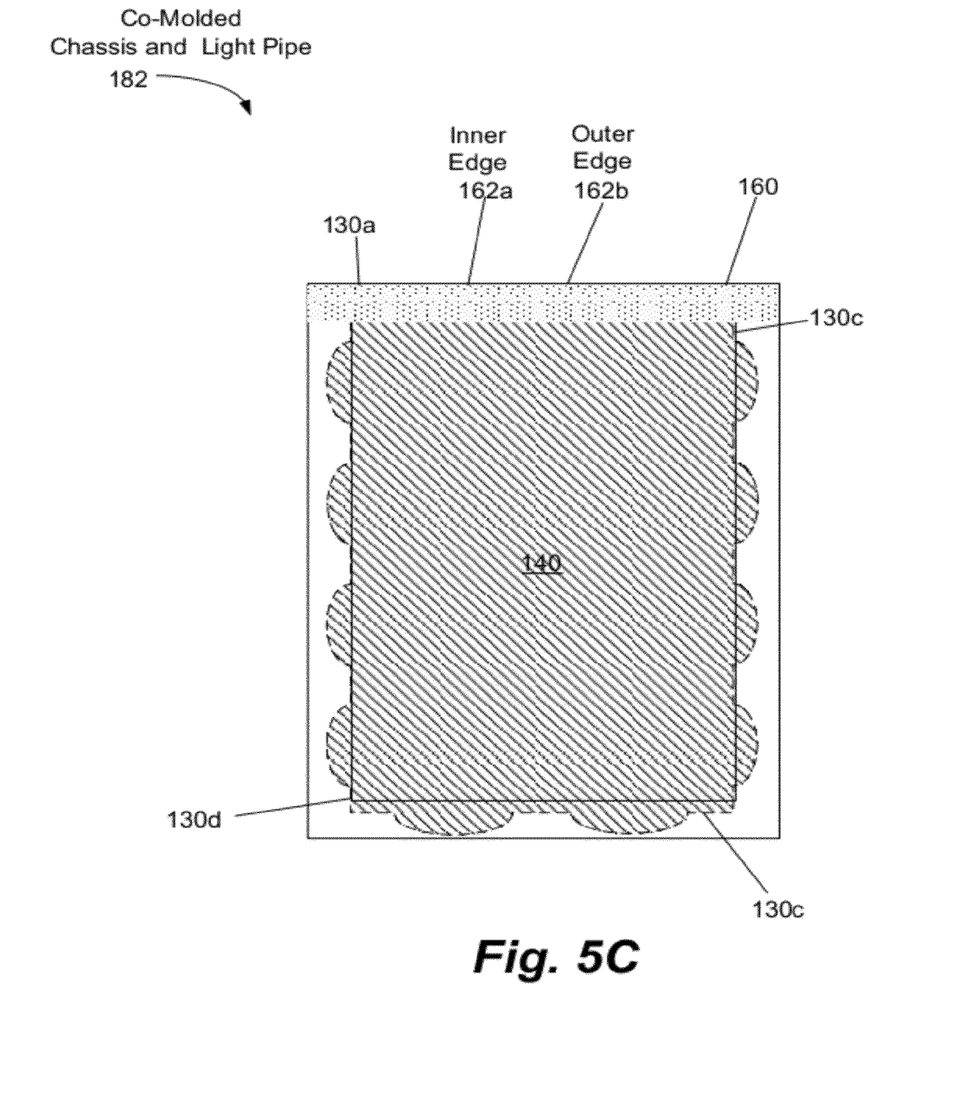

The design of a thin profile display including an integrally formed light pipe and perimeter chassis and its use in portable electronic devices are discussed below with reference to FIGS. 1A-7C. However, those skilled in the art will readily appreciate that the detailed description given herein with respect to these figures is for explanatory purposes only and should not be construed as limiting. In particular, with respect to FIGS. 1A and 1B, top and side views of a display assembly including a light pipe integrally formed with a perimeter chassis are described. Details of a light pipe are described with respect to FIG. 2. Cross sectional views of a display glass and the light pipe with an external force applied are discussed with respect to FIG. 3. In FIGS. 4A and 4B, light pipes with different edge shapes are discussed. The edge shapes can affect a distribution of light emitted from the light pipe. In FIGS. 5A-5C, light pipes integrally formed with the perimeter chassis are described. Methods of generating an integrally formed light pipe and perimeter chassis are discussed with respect to FIG. 6. Finally, an example of a portable electronic that can include a display with an integrally formed light pipe and perimeter chassis are described with respect to FIGS. 7A, 7B and 7C.

Figure 1A:
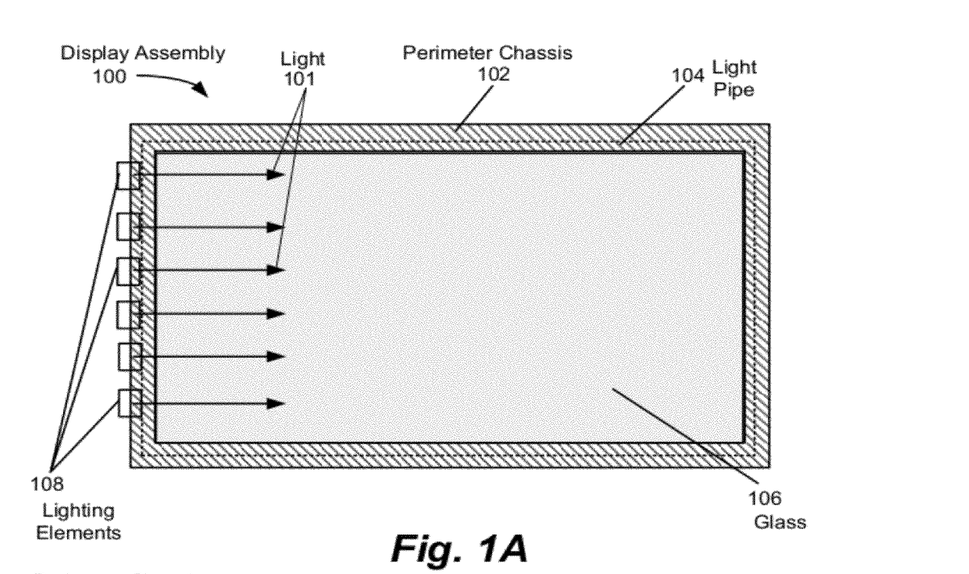
FIG. 1A shows a top view of a display assembly for a portable electronic device in accordance with the described embodiments.

FIG. 1A shows a top view of a display assembly 100 for a portable electronic device. The display assembly 100 includes a display glass 106. The display glass 106 may include a number of controllable elements, such as liquid crystals, with a variable transmissivity. A processor and a display controller, coupled to the display glass, can be configured to control the transmissivity of each of the elements to form images on the display glass. A light pipe 104 can be disposed beneath the display glass 106 to allow the formed images to be viewed.

The light pipe 104 can be configured to transmit light 101 emitted from one or more lighting elements, such as 108. In particular embodiments, the lighting elements can be one or more light emitting diodes (LEDs) or a florescent light bulb. In the embodiment in FIG. 1A, the lighting elements are located at one end of the light pipe 104 and light is transmitted to the opposite end of light pipe where a portion of the light is emitted upwards through the bottom of the display glass 106. In other embodiments, the lighting elements 108 can be distributed differently. For instance, lighting elements can be located at both ends of the light pipe. In another example, the lighting elements can be located on one of the longer sides of the light pipe 101 rather than one of the short sides. In yet another example, one or more of the lighting elements can be positioned beneath the light pipe.

The light pipe 106 can be configured to transmit the light 101 emitted from the lighting elements 108 such that the display glass 106 is illuminated with a substantially even brightness. The substantially even brightness allows the images formed on the display glass 106 to be viewed with its intended contrast level, i.e., with the relative brightness of one portion of the image relative to another portion of the image determined by the image properties. If the brightness level generated by the light pipe 104 is uneven, then the contrast level in the image is determined by both the image properties and the variability in the brightness level of the light pipe. If the variability in the brightness levels of the light 101 is significant in the light pipe 104, then the image formed on the display glass 106 can appear distorted.

The perimeter chassis 102 surrounds the display glass 106. The display glass 106 can be sized such that it fits within the perimeter chassis 102. When assembled in this position within the perimeter chassis, the display glass 106 can be properly aligned and held in place relative to other display assembly components, such as the light pipe 102. The perimeter chassis 102 can be used to secure the display assembly 100 within the housing of an electronic device (e.g., see FIG. 7A-7B.)

The perimeter chassis 102 and the light pipe 104 can be secured to one another in some manner. In one embodiment, the light pipe 104 and the perimeter chassis 102 can be formed separately and then bonded and/or attached together in some manner. In another embodiment, which is described in more detail as follows, the perimeter chassis 102 and the light pipe 104 can be integrally formed using a co-molding process.

Figure 1B:
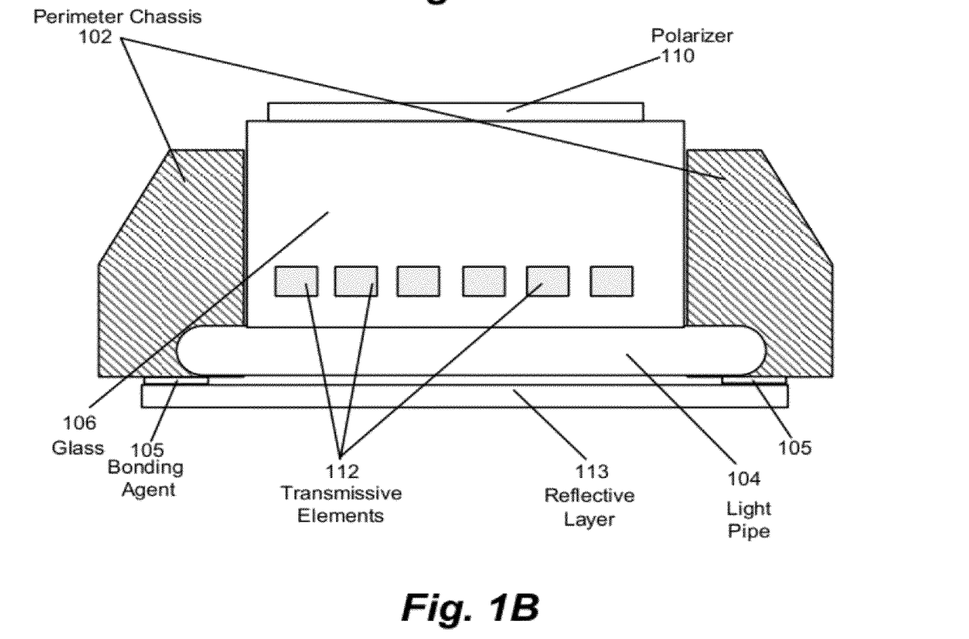
FIG. 1B shows a side view of a display assembly for a portable electronic device in accordance with the described embodiments.

FIG. 1B shows a side view of a display assembly 100 for a portable electronic device. The display glass 106 can be sized to fit within the perimeter chassis such that is surrounded by the perimeter chassis. The height of the display glass 106 can extend above a height of the perimeter chassis 102. In other embodiments, the perimeter chassis 102 can extend above the height of the display glass 106. The display glass 106 can include a number of transmissive elements 112. As described above, the transmissivity of each of the elements 112 can be controlled by a processor and/or a display controller to generate viewable images on the display.

A light polarizer 110 can be located on top of the display glass 106. When the display assembly 100 is installed, a cover glass and a touch screen (each not shown) can be located above the polarizer 110 and the display glass 106. A light pipe 104 is disposed beneath the display glass 106. The light pipe 104 is configured to transmit light through a bottom of the display glass and out a top of the display glass 106. The light transmitted through the light pipe allows images formed in the display glass 106 using the transmissive elements 112 to be viewed.

The perimeter chassis 102 can partially surround and be in contact with the light pipe. In areas the perimeter chassis 102 and the light pipe 104 are in contact with another, the perimeter chassis 102 and the light pipe 104 can be bonded to one another. For instance, the perimeter chassis 102 and the light pipe 104 can be bonded to one another during a co-molding process (e.g., see FIG. 6).

A reflective layer 113 can be located beneath the light pipe 104. The reflective layer 113 can be configured to reflect light emitted from the light pipe 104 in a downward direct back towards the light pipe. In one embodiment, a reflective layer 113 can be attached to the perimeter chassis 102 and/or the light pipe 104 using a bonding agent such as 105. In another embodiment, a reflective coating, such as a reflective paint, can be applied to the bottom of the light pipe to form the reflective layer 113.

Figure 2:
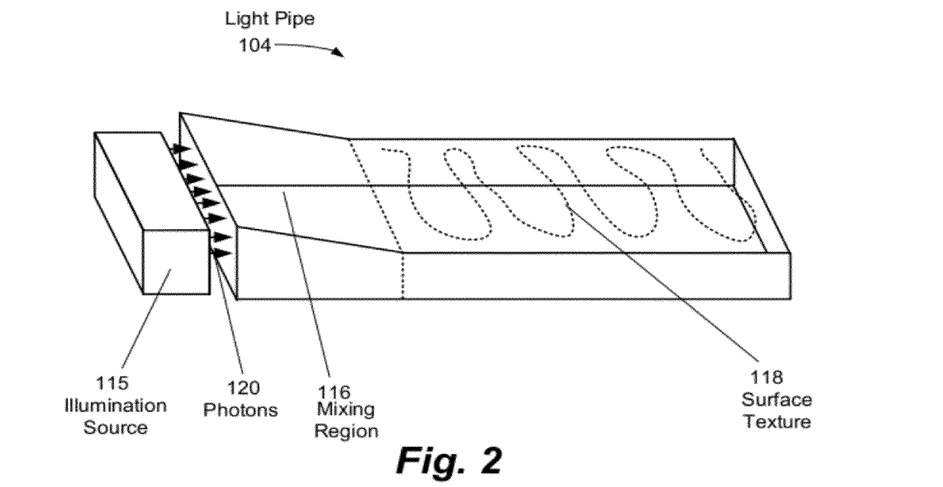
FIG. 2 shows a perspective view of a light pipe in accordance with the described embodiments.

FIG. 2 shows a perspective view of a light pipe 104 and illumination source 115. The illumination source 115 can emit photons 120. The light pipe 104 can include a thicker portion that acts as a mixing region 116. In the mixing region, light from a number of illumination sources, such as different LEDs can be mixed together. The light exiting the mixing region 116 can be more uniform in its brightness than the light entering the mixing region.

After the light exits the mixing region 116, it travels down the remainder of the light pipe 104 towards its opposite end. The light exiting the light pipe 104 from the sides and bottom can be reflected and/or absorbed depending on the materials that surround the light pipe. For instance, as described above with respect to FIG. 1B, a reflective layer can be located below the light pipe 104 that is designed to reflect light exiting the bottom of the light pipe back into the light pipe. Light exiting the light pipe 104, other than through the top of the light pipe, decreases a maximum brightness of the display glass above the light pipe. Thus, it is usually desirable to minimize the light losses through the sides and bottom of the light pipe.

In an embodiment described in more detail with respect to FIGS. 5A and 5C, the material of the perimeter chassis surrounding the light pipe 104 can be a relatively optically absorptive, such as a black material. Thus, light passing out the sides of the light pipe 104 can be absorbed by the perimeter chassis and prevent light leakage into the interior of the device surrounding the light pipe 104. In other designs in which the light pipe and the perimeter chassis are not integrally formed, a more optically reflective material can be required for the perimeter chassis because the light leakage out the sides of the light pipe can be too large. A downside of using a more optically reflective material for the perimeter chassis is light can be scattered into other portions of the interior housing where it is not desired.

In the embodiments described herein, the light pipe 104, which is integrally formed with the perimeter chassis, can be thinner than other designs where the perimeter chassis and the light pipe are not integrally formed. As the light pipe 104 becomes thinner, losses out the sides of the light pipe decrease because the surface area of the sides decreases. In addition, in the embodiments described herein, the sides of the light pipe 104 can be integrated into perimeter chassis such that the gaps between the light pipe and the perimeter chassis are minimized as compared to designs where the light pipe and perimeter chassis are separately formed. The minimization of the gaps between the light pipe and perimeter chassis also can reduce light leakage. The reduced light leakage from a thinner and more closely integrated light pipe can allow a black material to be used for the perimeter chassis. In some instances, it may be desirable to use a black material for cosmetic purposes.

The light pipe 104 can be configured such that a majority of the light exits a top surface of the light pipe. The light exiting the top surface can enter a bottom of the display glass 106 to illuminate images formed on the display 106. The top surface of the light pipe 104 can be textured. The texturing can be designed to evenly diffuse the light as it exits the light pipe and minimize variations in the brightness of the light across the top surface of the light pipe. In another embodiment, a layer with diffusive properties can be disposed between the light pipe 104 and the display glass 106.

Figure 3:
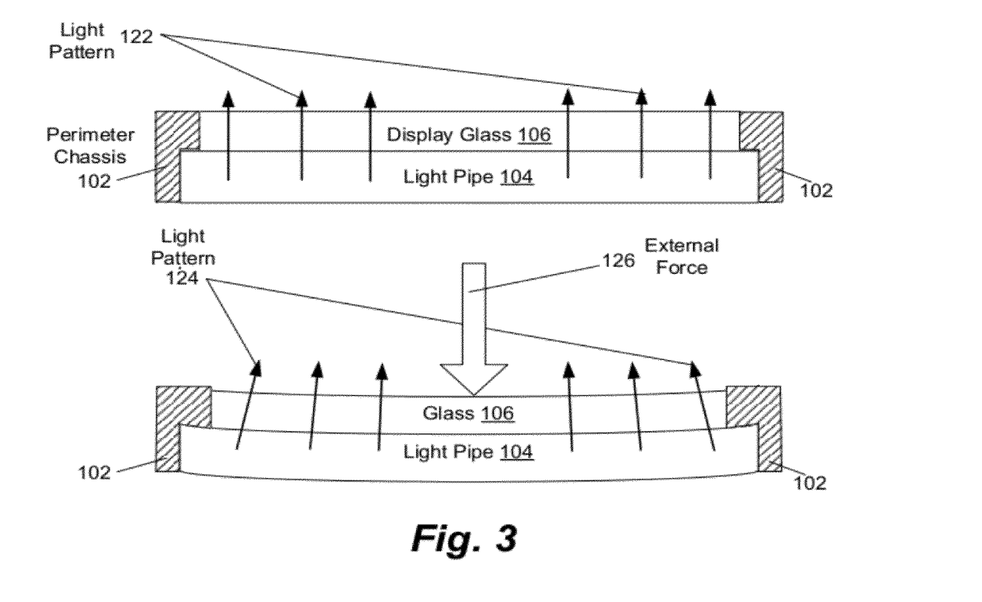
FIG. 3 shows a cross-sectional view of a display glass and light pipe with and without deformation in accordance with the described embodiments.

FIG. 3 shows a cross-sectional view of a display glass 106 and light pipe 104 integrally formed with a perimeter chassis with and without deformation. In the top of FIG. 3, the light pipe 104, display glass 106 and perimeter chassis 102 are substantially flat and a first light pattern 122 from the light pipe is generated. In the bottom of FIG. 3, an external force is applied to the display assembly. For instance, an external force can be applied by a user that is interacting with a touch screen that is located above the glass. The application of the external force 126 can cause the light pipe 104 to slightly deform, which can slightly alter the light pattern 124 emitted from the light pipe 104.

Since the light pipe 104 is anchored to the perimeter chassis, the external force 126 can be distributed throughout the light pipe and into the perimeter chassis. This spreading out of the force 126 can reduce the bending in a particular area as compared to if the force 126 is not spread out. Thus, although the light pattern 124 from the light pipe can be slightly altered due to the deformation of the light pipe 104, the design can keep the deformation small enough that its effect on a displayed image is deemed acceptable.

FIGS. 4A-4B show top views of light pipes 140 and 142. Light pipes, 140 and 142, include sides, 130a, 130b, 130c and 130d, and sides, 132a, 132b, 132c and 132d, respectively. Each of the sides of the light pipes can include an edge pattern. For instance, on light pipe 140, side 130a includes edge pattern 131a, side 130b, includes edge pattern 131b, side 130c edge pattern 131c and side 130d includes edge pattern 131d. Further, on light pipe 142, side 132a includes edge pattern 133a, side 132b, includes edge pattern 133b, side 132c edge pattern 133c and side 132d includes edge pattern 133d.

The edge patterns on each light pipe can be selected to affect the light distribution emitted from the light pipe. For instance, the edges can be shaped to produce a more even distribution of light near the edges of the light pipe. The edge patterns can vary around the sides of each light pipe, such as 140 and 142, as well as vary from light pipe design to light pipe design. For instance, the edge pattern 133a on side 132a of light pipe 142 is different than the edge pattern 133c on side 133c. Edge pattern 133a includes more bumps than edge pattern 133c. As another example, edge pattern 131b on side 130b of light pipe 140 is different than edge pattern 133b on side 132b of light pipe 142. Edge pattern 131b includes more and smaller bumps than edge pattern 133b.

In other embodiments, the edge patterns can vary along the length of a side, such as 131b and 131d. As an example, if the light sources were located near side 131c of light pipe 140, then the edge patterns along sides 131b and 131d might be varied as the distance from the light source is increased.

Simulations, such as simulations involving ray tracing, can be performed where light rays are emitted from the light sources proximate to the light pipe. Reflections and absorption of the light rays can be modeled as the light rays travel through the light pipe. Based upon the simulation, a prediction can be made of the intensity of the light exiting a top surface of the light pipe including the relative evenness of the light distribution. The reflections and absorption of the light rays can include modeling the reflection or absorption of light that passes through the bottom and sides of the light pipe. Based upon these simulations, the edge patterns can be shaped to produce a more even distribution of light across the top surface of the light pipe.

FIGS. 5A-5C show top views of an integrally formed light pipes and perimeter chassis in accordance with the described embodiments. In one embodiment, the perimeter chassis can be co-molded with the light pipe. First, the light pipe can be molded, such as in a first shot of an injection molding process, then the perimeter chassis can be molded on top of the light pipe, such as in a second shot of an injection molding process. In other embodiments, the perimeter chassis can be formed first in a molding process followed by the light pipe. In yet other embodiments, the light pipe and the perimeter chassis can be separately formed and then molded together.

The materials used for the light pipe and the perimeter chassis can be different. For instance, the light pipe can be formed from an optical grade transparent material, such as a polycarbonate plastic, while the perimeter chassis can be formed from an opaque material such as an absorptive, optically black material. The material properties of the light pipe and the perimeter chassis can be selected such that the light pipe and the perimeter chassis can bond together during the injection molding process. In other embodiments, the light pipe and the perimeter chassis can be formed separately. Then, a bonding agent can be used to bond the light pipe to the perimeter chassis.

In FIGS. 5A and 5B, top views of co-molded light pipes and perimeter chassis, 180 and 181 are shown. In both examples, a perimeter chassis 150 and 152, respectively is formed over light pipe 140 described above with respect to FIG. 4A. The dimensions of the perimeter chassis 150 and 152 can be varied to satisfy design objectives associated with the strength and optical properties of the formed components. For example, a distance between inner edge 156a and outer edge 156b of perimeter chassis 150 is smaller than the distance between inner edge 154a and outer edge 154b of perimeter chassis. Thus, perimeter chassis 152 may be stiffer than perimeter chassis 150.

As another example, in FIG. 5A, the dimensions of perimeter chassis 150 are selected such that the spaces between each of the bumps around the sides of the light pipe 140 are totally filled by the perimeter chassis 150. In FIG. 5B, the dimensions of the perimeter chassis 152 are selected such that a gap 156 exists between the perimeter chassis 152 and the light pipe 140 in the space between the bumps. The gap 156 can be provided to alter the optical characteristics of the light pipe, such as to improve the distribution of light emitted from the light pipe near its edges.

In FIG. 5C, another embodiment of a light pipe co-molded with a chassis 182 is illustrated. In one embodiment, the optical characteristics of the perimeter chassis 182 can be selected to be constant. For instance, the perimeter chassis can be formed from a single material that is relatively absorptive and thus, optically black. In another embodiment, as shown in FIG. 5C, the optical properties of the perimeter chassis can be vary across the surface of the perimeter chassis. As is shown, the optical properties of the perimeter chassis 160 are different in the area between inner edge 162a and 162b as compared to the rest of the chassis. For instance, one portion of the perimeter chassis 160 can be more absorptive, i.e., more black, than another portion of the perimeter chassis. The optical properties of the perimeter chassis can be varied to improve the light distribution of the light that is transmitted through the display glass since light exiting the sides of the light pipe are absorbed, reflected and scattered depending on the optical properties of the surrounding perimeter chassis.

In one embodiment, the perimeter chassis with varying optical properties can be formed by doping a common plastic with a material that alters its optical properties, i.e., changes its relative reflectance and absorbance. Then, the doped plastic can be injected into a mold where at a first location of the perimeter chassis in the mold a plastic with a first dopant level is injected and at a second location of the perimeter chassis in the mold a plastic with a second dopant level is injected. The injection of the plastics with different dopant levels can result in a perimeter chassis, such as 182, where the optical properties are different at different locations.

Figure 6:
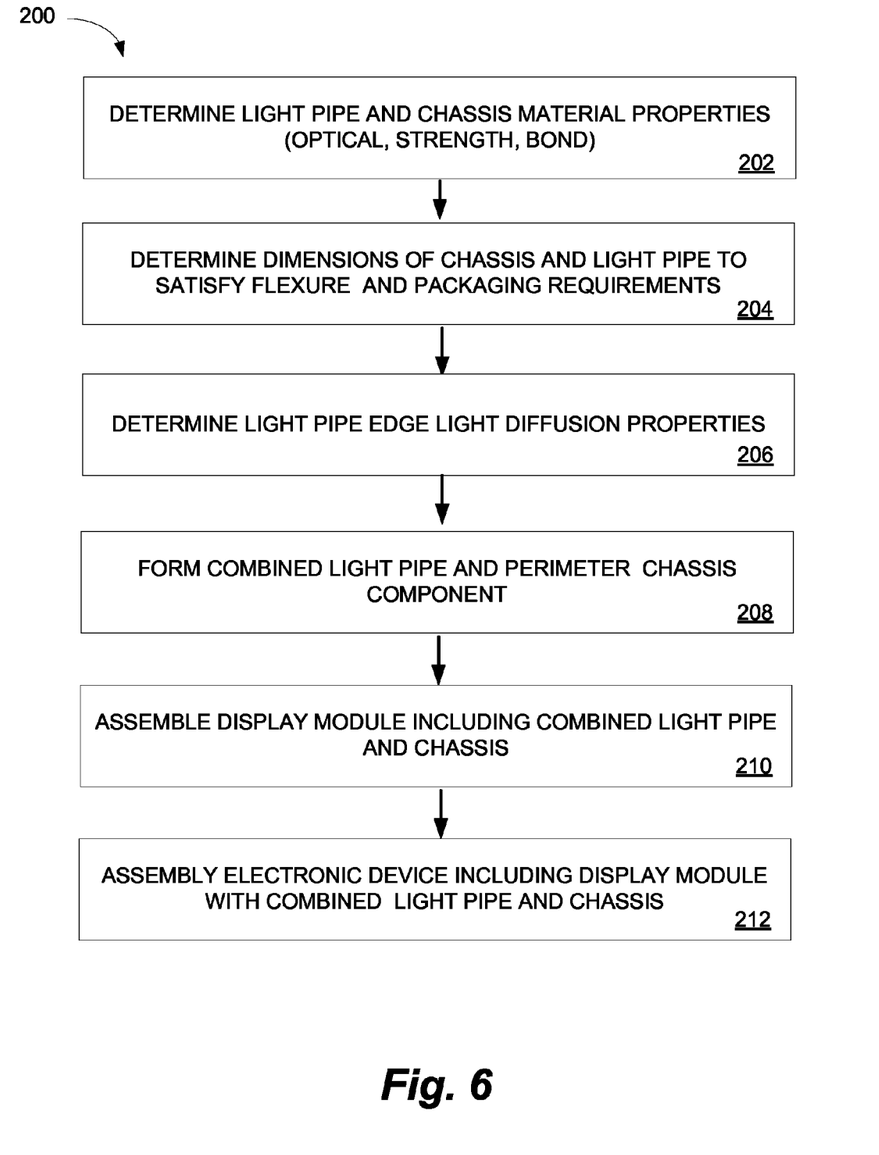
FIG. 6 is flow chart of a method of manufacturing a portable electronic device with an integrally formed light pipe and perimeter chassis in accordance with the described embodiments.

FIG. 6 is flow chart of a method 200 of manufacturing a portable electronic device with an integrally formed light pipe and perimeter chassis. In 202, the light pipe and perimeter chassis material properties can be determined. The light pipe is typically formed from an optical grade transparent material, such as a polycarbonate plastic. The plastic can be selected to be compatible with a manufacturing process, such as an injection molding process.

If the perimeter chassis and the light pipe are co-molded, such as in a double shot injection molding process, then the material selected for the perimeter chassis can be selected such that bond forms between the perimeter chassis and the perimeter chassis during the molding process without providing an additional bonding agent. If the perimeter chassis and light pipe are separately formed and then bonded together, a suitable bonding agent that is compatible with the materials used for the light pipe and the perimeter chassis can be selected. The coefficients of the thermal expansion for the perimeter chassis and the light pipe can be selected such that any bonds formed between the perimeter chassis and the light pipe are not broken as a result of different rates of thermal expansion between the materials and undesired bending does not occur.

Different optical properties for the perimeter chassis can be selected to satisfy illumination objectives associated with the light pipe such as to effect the light distribution through the top surface of the light pipe proximate to the edges. In one embodiment, to effect light distribution near the edges of the light pipe, the reflectance of the perimeter chassis can be varied from a more reflective optically white material to a more absorptive optically black material. The optical properties of the perimeter chassis may be substantially homogeneous over its surface. For instance, the perimeter chassis may be formed from a black material that is mostly light absorbing. In another embodiment, the optical properties of the perimeter chassis can vary from portion to portion. For instance, two sides of the perimeter chassis can be formed from a more reflective material (e.g., optically white) while the other sides can be formed from a more absorptive material (e.g., optically black).

Further, the perimeter chassis can be formed from two different materials with different indexes of refraction. First instance, a first portion of the perimeter chassis can be formed from a material with a first index of refraction and a second portion of the perimeter chassis can be formed from a material with a second index of refraction. At the boundaries between the two materials, reflection of light can occur as a result of the differences in the indexes of refraction, such as light passing from the first material to the second material.

In 204, the dimensions of the chassis and the light pipe can be selected to meet strength and packaging requirements. An example of a packaging requirement can be an overall thickness of the display. An example of a strength requirement can be limiting the amount of movement of the light pipe to below a threshold value when an external force is applied to the display, such as the external force of user inputting information via a touch screen interface located above the display. The packaging and strength requirements may affect parameters such as a thickness of the light pipe and a height and thickness of the perimeter chassis. These parameters can affect one another. Thus, trade-offs can be performed involving adjusting combinations of these parameters, such as increasing a height of the perimeter chassis while reducing the thickness of the light pipe or vice versa.

In 206, a light pipe edge shape can be determined. The shape of the light pipe edge can affect a distribution of light across the top surface of light and in particular the light distribution proximate to the edge of the pipe. As described above, it is desirable to provide a substantially even brightness across a top surface of the light pipe. In various embodiments, the brightness distribution across the top surface of the light pipe can be simulated using a program, such as ray tracing program, that simulates a distribution of light including its direction distribution as it enters the light pipe. Then, the light entering the light pipe can be tracked in the simulation on a photon by photon basis as it travels through the light pipe and is scattered, reflected and/or absorbed by various surfaces until it exits the light pipe. Based upon the simulation, the light distribution exiting the top surface of the light pipe can be estimated including the effects of the edge pattern of the light pipe on the light distribution across the top surface. In response to the simulation, the edge pattern of the light pipe can be adjusted to improve evenness of the light distribution across its top surface.

In 208, the light pipe and the perimeter chassis component can be formed. In one embodiment, the light pipe and the perimeter chassis can be formed separately. For example, the light pipe and the perimeter chassis can be formed using two separate molding or machining processes. Then the light pipe and the perimeter chassis can be bonded together using a bonding agent, such as an epoxy.

In another embodiment, the light pipe and the perimeter chassis can be integrally formed in a co-molding process. For example, in a first shot of an injection molding process, the light pipe can be formed, then, in a second shot of an injection molding process, the perimeter chassis can be coupled to the light pipe. The materials for the light pipe and the perimeter can be selected such that a bond is formed between the light pipe and the perimeter chassis during the molding process. For instance, when the material for the perimeter chassis is injected over the light pipe, the surfaces of the light pipe in contact with the molten perimeter chassis may melt slightly and the perimeter chassis and light pipe material may mix together to bond the two component together.

In 210, a display module included the integrated light pipe and perimeter chassis component can be formed. The assembly process can include but is not limited to one or more of coupling the illumination sources to the light pipe, adding a reflective layer beneath the light pipe, placing the display glass into a cavity formed by the perimeter chassis and light pipe or placing a polarizing layer above the display glass. In one embodiment, a diffusion layer can be placed between the light pipe and the display glass. In another embodiment, the top surface of the light pipe can be textured to provide a diffusion layer. In 212, the assembled display module can be installed in an electronic device.

Figures 7A, 7B:
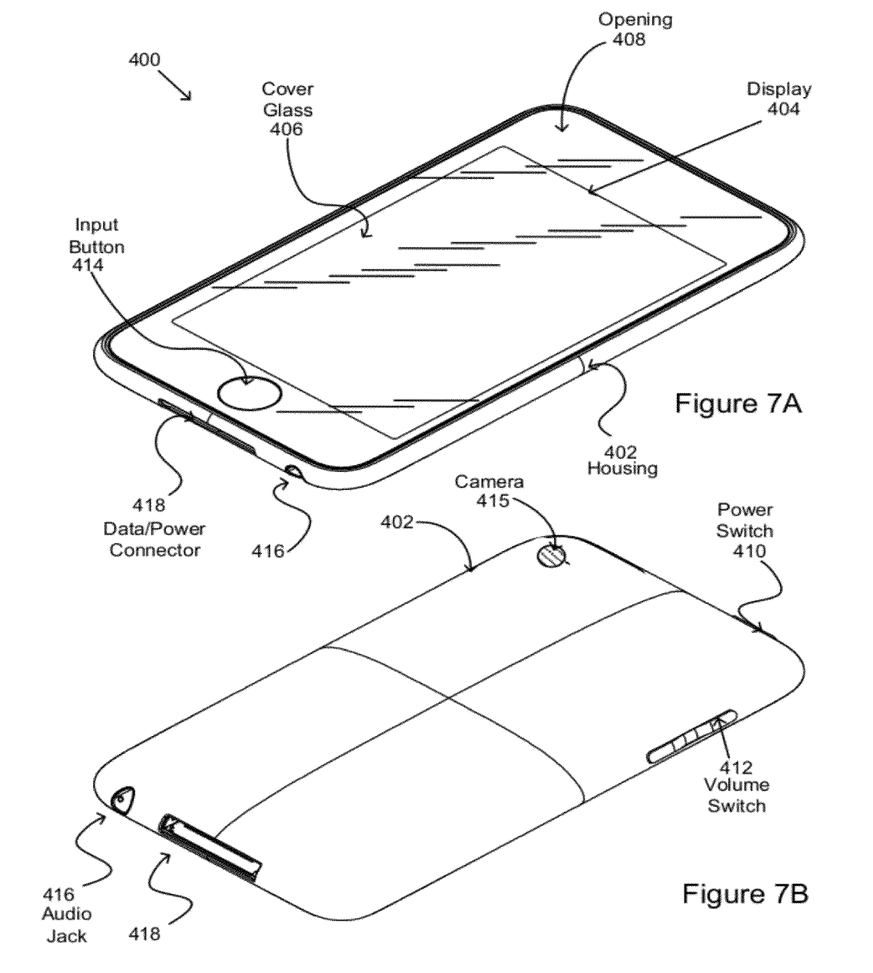
FIG. 7A shows a top view of a portable electronic device in accordance with the described embodiments.
FIG. 7B shows a bottom view of a portable electronic device in accordance with the described embodiments.

FIGS. 7A and 7B show a top and bottom view of a portable computing device 400 in accordance with the described embodiments. The portable computing device and its associated form factor is provided for the purposes of illustration only and is not meant to limit the types of the devices on which an integrally formed light pipe and perimeter chassis can be used. The portable computing device can be suitable for being held in hand of a user. A cover glass 406 and a display 404 can be placed within an opening 408 of housing 402. The display 404 can include an integrally formed light pipe and perimeter chassis as described above with respect to FIGS. 1A-6 located within the interior of the device 400.

The cover glass can include an opening for an input mechanism, such as input button 414. In one embodiment, the input button 414 can be used to return the portable computing device to a particular state, such as a home state. A touch screen interface can be associated with the display 404. The touch screen interface can also be used to control a state of the portable device and to provide inputs for various applications executed on the portable device.

Other input/output mechanisms can be arranged around a periphery of the housing 402. For instance, a power switch, such as 410 can be located on a top edge of the housing and a volume switch, such as 412, can be located along one edge of the housing. An audio jack 416 for connecting headphones or another audio device and a data/power connector interface are located on the bottom edge of the housing. The housing 400 also can include an aperture for a camera 415 that allows video data to be received.

Figure 7C:
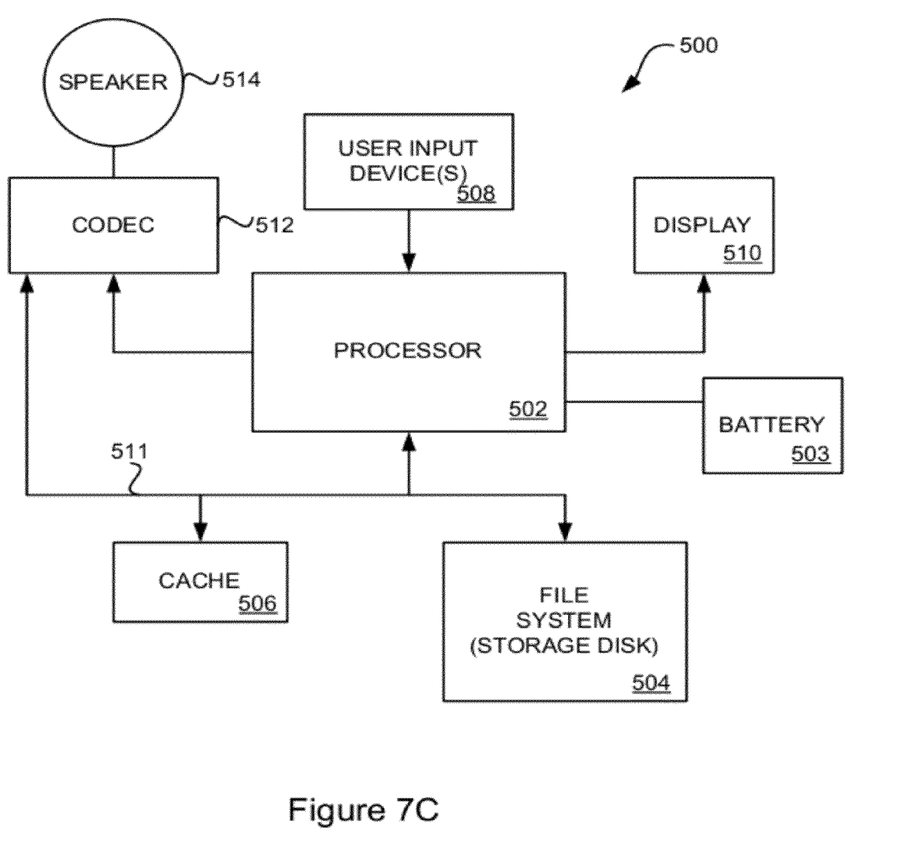
FIG. 7C shows block diagram of a portable electronic device in accordance with the described embodiments.

FIG. 7C is a block diagram of an electronic device 500 in accordance with the described embodiments. The electronic device 500 can include a processor 502 that pertains to a microprocessor or controller for controlling the overall operation of the electronic device 500. The processor 502 can receive control signals from various input mechanisms described with respect to FIGS. 7A and 7B. Based upon the received control signal, the processor 502 can operate the device 500 in accordance with the signal.

In one embodiment, the electronic device 500 can be configured to operate as a media player. In other embodiments, the electronic 500 can be configured to operate with other types of functionality, such as a cell phone, an Internet appliance, a video player, a video recorder, a game player and a voice recorder. In general, the electronic device 500 can provide a number of different functions depending on different applications that are stored on and executed by the electronic device.

In media player mode, the electronic device 500 can store media data pertaining to media items in a file system 504 and a cache 506. The file system 504 can, typically, be a storage disk or a plurality of disks or a solid-state storage device, such as flash memory. The file system can provide high capacity storage capability for the media player 500. Further, since the access time to the file system 504 can be relatively slow, the media player 500 also can include a cache 506 to decrease memory access times. The cache 506 can be, for example, Random-Access Memory (RAM) provided by semiconductor memory.

The electronic device 500 can also include a user input device 408 that allows a user of the electronic device 500 to interact with the electronic 500. The user input device 508 can take a variety of forms, such as a button, keypad, dial, etc. Still further, the electronic device can include a display 510 (screen display) that can be controlled by the processor 502 to display information to the user. As described above, the display can include an integrally formed light pipe and perimeter chassis. A data bus 111 can facilitate data transfer between at least the file system 504, the cache 506, the processor 502, and the CODEC 512.

In one embodiment, the electronic device 500 can store a plurality of media items (e.g., songs, video files and podcasts) in the file system 504. After instantiating a media player application on the electronic device, when a user desires to have the media player play a particular media item, a list of available media items can be displayed on the display 510. Then, using the user input device 508, a user can select one of the available media items. The processor 502, upon receiving a selection of a particular media item, can supply the media data for the particular media item to a coder/decoder (CO-DEC) 512. The CODEC 512 can then produces analog output signals for a speaker 514. For a video based media item, a video CODEC can be utilized to output video images to the display 510. The speaker 514 can be a speaker internal to the media player 500 or external to the media player 100. For example, headphones or earphones that connect to the media player 500 would be considered an external speaker.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A display assembly comprising:
    a display glass comprising a plurality of variable transmissive elements, wherein the variable transmissive elements are configured to form one or more images on the display glass;
    a light pipe formed from a transparent optical grade material, wherein the light pipe is configured to generate a substantially even distribution of light across a top surface of the light pipe to illuminate a bottom surface of the display glass, wherein the light pipe is configured to receive the light for distribution from one or more illumination sources arranged along an edge of the light pipe; and
    a perimeter chassis directly bonded to the light pipe in surface regions proximate to the outer edges of the light pipe, wherein the perimeter chassis is configured to extend above the top surface of the light pipe such that an open cavity of the perimeter chassis is formed, and wherein the open cavity is configured to receive the display glass, and wherein the perimeter chassis is directly coupled to the display glass via the open cavity, and wherein the perimeter chassis and the light pipe are integrally formed and bonded to one another in a co-molding process, the bond between the light pipe and the perimeter chassis increasing a stiffness of the light pipe.

2. The display assembly of claim 1, wherein the light pipe and the perimeter chassis are formed from two different plastic materials selected to bond to one another during the comolding process.

3. The display assembly of claim 1, wherein the perimeter chassis extends around side edges of the light pipe and onto a top surface of the light pipe to form a substantially rectangular region that surrounds the display glass wherein the perimeter chassis is bonded to the light pipe along the side edges and the top surfaces.

4. The display assembly of claim 1, wherein one or more of the side edges of the light pipe are contoured to affect the distribution of light on the top of surface of the light pipe proximate to the edges.

5. The display assembly of claim 1, wherein the perimeter chassis formed from a relatively optically black material.

6. The display module of claim 1, wherein the perimeter chassis includes a first portion with an index of refraction that is different from a second portion.

7. The display module of claim 1, wherein the light pipe is formed in a first shot an injection molding process and the perimeter chassis is formed in a second shot of an injection molding process.

8. The display assembly of claim 1, wherein the display glass is disposed atop the top surface of the light pipe.

9. The display assembly of claim 1, wherein the open cavity of the perimeter chassis comprises a plurality of raised edges, wherein the raised edges are configured to align the display glass and the light pipe in a substantially stacked configuration.

10. A display comprising:
    a display glass including a plurality of variable transmissive elements, wherein the variable transmissive elements are configured to form images on the display glass;
    a light pipe, disposed beneath the display glass, formed from a transparent optical grade material, the light pipe configured to generate a substantially even distribution of light across a top surface of the light pipe to transmit light to a bottom surface of the display glass such that the images formed on the display glass are illuminated;
    one or more illumination sources arranged along an edge of the light pipe that generate the light that is distributed across the top surface of the light pipe; and
    a perimeter chassis directly bonded to the light pipe in surface regions proximate to the outer edges of the light pipe, the perimeter chassis extending above the top surface of the light pipe such that a substantially rectangular cavity of the perimeter chassis is formed, wherein the substantially rectangular cavity is configured to receive the display glass, and wherein the perimeter chassis is directly coupled to the display glass via the substantially rectangular cavity, and wherein the perimeter chassis and the light pipe are bonded to one another to increase a stiffness of the light pipe.

11. The display of claim 10, wherein the light pipe and the perimeter chassis are integrally formed during a co-molding process and bonded to one another during the co-molding process.

12. The display of claim 10, wherein the light pipe and perimeter chassis are formed separately and then bonded together.

13. The display of claim 10, further comprising: a polarizer disposed above the display glass.

14. The display of claim 10, further comprising: a reflective layer disposed beneath the light pipe configured to reflect light exiting a bottom surface of the light pipe upwards.

15. The display of claim 10, wherein the top surface of the light pipe is textured to diffuse light exiting the top surface of the light pipe.

16. An electronic device comprising:
a display comprising:
a display glass including a plurality of variable transmissive elements, the variable transmissive elements controlled to form images on the display glass;
a light pipe, disposed beneath the display glass, formed from a transparent optical grade material, the light pipe configured to generate a substantially even distribution of light across a top surface of the light pipe to transmit light to a bottom surface of the display glass such that the images formed on the display glass are illuminated;
a plurality of light emitting diodes arranged along an edge of the light pipe that generate the light that is distributed across the top surface of the light pipe; and
a perimeter chassis directly bonded to the light pipe in surface regions proximate to the outer edges of the light pipe, the perimeter chassis extending above the top surface of the light pipe such that a substantially rectangular cavity of the perimeter chassis is formed, wherein the substantially rectangular cavity is configured to receive the display glass, and wherein the perimeter chassis is directly coupled to the display glass via the substantially rectangular cavity, and wherein the perimeter chassis and the light pipe are bonded to one another to increase a stiffness of the light pipe;
a processor coupled to the display for controlling the images formed on the display glass; and
a battery coupled to the processor and the display.

17. The electronic device of claim 16, wherein the light pipe includes a mixing region for mixing the light generated from the plurality of light emitting diodes.

18. The electronic device of claim 16, wherein the light pipe and the perimeter chassis are integrally formed.

19. The electronic device of claim 16, wherein the light pipe and the perimeter chassis are separately formed and then bonded to another using a bonding agent.

20. The electronic device of claim 16, wherein transmissive elements comprise liquid crystals.

21. The electronic device of claim 16, wherein the perimeter chassis includes a first portion that is substantially light reflecting and a second portion that is substantially light absorbing.

22. The electronic device of claim 16, wherein the perimeter chassis, comprising the display glass and the light pipe, is configured to fit within a housing of the electronic device.

* * * * *